United States Patent
Lyon et al.

(10) Patent No.: US 9,794,479 B2
(45) Date of Patent: *Oct. 17, 2017

(54) PANORAMIC CAMERA WITH MULTIPLE IMAGE SENSORS USING TIMED SHUTTERS

(71) Applicant: Google Inc., Mountain View, CA (US)

(72) Inventors: Richard Francis Lyon, Los Altos, CA (US); Gary Embler, Redwood City, CA (US); Iain Richard Tyrone McClatchie, Los Altos, CA (US); Jason Holt, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/006,449

(22) Filed: Jan. 26, 2016

(65) Prior Publication Data

US 2016/0142632 A1    May 19, 2016

Related U.S. Application Data

(60) Continuation of application No. 13/780,493, filed on Feb. 28, 2013, now abandoned, which is a division of
(Continued)

(51) Int. Cl.
*H04N 5/232* (2006.01)
*H04N 5/235* (2006.01)

(52) U.S. Cl.
CPC ....... *H04N 5/23238* (2013.01); *H04N 5/2353* (2013.01); *H04N 5/23203* (2013.01)

(58) Field of Classification Search
CPC .......... H04N 5/23203; H04N 5/23238; H04N 5/2353
(Continued)

(56) References Cited

U.S. PATENT DOCUMENTS

| 4,062,045 A | 12/1977 | Iwane |
| 4,532,550 A | 7/1985 | Bendell et al. |

(Continued)

FOREIGN PATENT DOCUMENTS

| JP | 2006217222 A | 8/2006 |
| JP | 2006350713 A | 12/2006 |

(Continued)

OTHER PUBLICATIONS

Yoon et al, Non-intrusive Iris Image Capturing System Using Light Stripe Projection and Pan-Tilt-Zoom camera, 2007.*
(Continued)

*Primary Examiner* — Shan Elahi
(74) *Attorney, Agent, or Firm* — Lerner, David, Littenberg, Krumholz & Mentlik, LLP

(57) ABSTRACT

The present invention relates to the field of panoramic still and motion photography. In a first embodiment, a camera apparatus for panoramic photography includes a first image sensor positioned to capture a first image. The first image sensor has a rolling-shutter readout arranged in portrait orientation. The camera apparatus also includes second image sensor positioned to capture a second image. The second image sensor has a rolling-shutter readout arranged in portrait orientation. Finally, the camera apparatus includes a controller configured to signal the second image sensor to start capturing the second image before the first image sensor finishes capturing the first image. At least a portion of the first image is in front of the second image relative to a forward direction of the camera apparatus.

14 Claims, 6 Drawing Sheets

Related U.S. Application Data application No. 12/368,014, filed on Feb. 9, 2009, now Pat. No. 8,493,436.

(60) Provisional application No. 61/027,237, filed on Feb. 8, 2008.

(58) Field of Classification Search
USPC .......................................................... 348/36
See application file for complete search history.

(56) References Cited

U.S. PATENT DOCUMENTS

| | | | |
|---|---|---|---|
| 5,023,723 A | 6/1991 | Date et al. | |
| 5,128,767 A | 7/1992 | Suzuki et al. | |
| 5,473,364 A | 12/1995 | Burt | |
| 5,495,576 A | 2/1996 | Ritchey | |
| 5,657,073 A | 8/1997 | Henley | |
| 5,703,961 A | 12/1997 | Rogina et al. | |
| 5,801,760 A | 9/1998 | Uomori | |
| 6,108,440 A | 8/2000 | Baba et al. | |
| 6,118,475 A | 9/2000 | Iijima et al. | |
| 6,141,034 A | 10/2000 | McCutchen | |
| 6,327,381 B1 | 12/2001 | Rogina et al. | |
| 6,535,114 B1 | 3/2003 | Suzuki et al. | |
| 6,593,960 B1 | 7/2003 | Sugimoto et al. | |
| 6,669,346 B2 | 12/2003 | Metcalf | |
| 6,778,207 B1* | 8/2004 | Lee | H04N 5/23238 348/36 |
| 6,795,113 B1* | 9/2004 | Jackson | G08B 13/19626 348/143 |
| 6,839,081 B1 | 1/2005 | Iijima et al. | |
| 6,993,159 B1 | 1/2006 | Ishii et al. | |
| 7,012,637 B1 | 3/2006 | Blume et al. | |
| 7,015,951 B1 | 3/2006 | Yoshigahara et al. | |
| 7,277,118 B2 | 10/2007 | Foote | |
| 7,307,655 B1 | 12/2007 | Okamoto et al. | |
| 7,388,598 B2 | 6/2008 | Lee et al. | |
| 7,436,429 B2 | 10/2008 | Tillotson | |
| 7,567,293 B2 | 7/2009 | Perlman et al. | |
| 7,697,028 B1 | 4/2010 | Johnson | |
| 7,710,463 B2 | 5/2010 | Foote | |
| 7,990,394 B2 | 8/2011 | Vincent et al. | |
| 8,027,531 B2 | 9/2011 | Wilburn et al. | |
| 8,094,182 B2 | 1/2012 | Park et al. | |
| 8,493,436 B2* | 7/2013 | Lyon | H04N 5/23203 348/47 |
| 8,937,643 B1* | 1/2015 | Esteban | H04N 5/3532 348/43 |
| 9,253,480 B2* | 2/2016 | Ohba | G02B 27/2214 |
| 2001/0015751 A1 | 8/2001 | Geng | |
| 2001/0038413 A1 | 11/2001 | Peleg et al. | |
| 2002/0102101 A1* | 8/2002 | Pelletier | G08B 13/19628 396/85 |
| 2002/0122113 A1* | 9/2002 | Foote | G06T 3/4038 348/48 |
| 2004/0001138 A1 | 1/2004 | Weerashinghe et al. | |
| 2004/0027451 A1 | 2/2004 | Baker | |
| 2004/0100443 A1 | 5/2004 | Mandelbaum et al. | |
| 2004/0160512 A1 | 8/2004 | Lee et al. | |
| 2004/0202381 A1 | 10/2004 | Kitajima | |
| 2004/0212723 A1 | 10/2004 | Lin | |
| 2005/0018253 A1 | 1/2005 | Takeda | |
| 2005/0035297 A1* | 2/2005 | Crosetto | G01T 1/1642 250/367 |
| 2005/0110869 A1 | 5/2005 | Tillotson | |
| 2006/0028550 A1* | 2/2006 | Palmer | G08B 13/19619 348/155 |
| 2006/0033813 A1* | 2/2006 | Provinsal | H04N 7/181 348/143 |
| 2006/0033966 A1* | 2/2006 | Yamamoto | H04N 5/23248 358/474 |
| 2006/0125921 A1* | 6/2006 | Foote | G06T 3/4038 348/159 |
| 2006/0157760 A1 | 7/2006 | Hayashi et al. | |
| 2006/0268103 A1 | 11/2006 | Kweon et al. | |
| 2007/0014551 A1 | 1/2007 | Fujisawa et al. | |
| 2007/0030342 A1* | 2/2007 | Wilburn | H04N 5/247 348/47 |
| 2007/0081091 A1 | 4/2007 | Pan et al. | |
| 2007/0116453 A1 | 5/2007 | Uchiyama | |
| 2007/0182812 A1 | 8/2007 | Ritchey | |
| 2007/0263117 A1* | 11/2007 | Kera | H04N 5/2353 348/362 |
| 2008/0018774 A1 | 1/2008 | Nakajima et al. | |
| 2008/0117287 A1 | 5/2008 | Park et al. | |
| 2008/0117288 A1 | 5/2008 | Park | |
| 2008/0303894 A1* | 12/2008 | Ernst | G06T 7/571 348/43 |
| 2009/0262196 A1* | 10/2009 | Salivar | G08B 13/19643 348/159 |
| 2009/0295971 A1 | 12/2009 | Tsuchiya | |
| 2009/0322856 A1 | 12/2009 | Duparre | |
| 2010/0002073 A1* | 1/2010 | Robinson | H04N 13/0018 348/42 |
| 2010/0066897 A1 | 3/2010 | Miyanari | |
| 2010/0133424 A1* | 6/2010 | Lindsay | A63B 69/3658 250/237 R |
| 2010/0165160 A1 | 7/2010 | Olmstead et al. | |
| 2010/0328435 A1* | 12/2010 | Puah | G01B 11/0608 348/47 |
| 2011/0178756 A1* | 7/2011 | Anderson | G06F 17/50 702/104 |
| 2011/0304746 A1* | 12/2011 | Iijima | G03B 7/097 348/229.1 |
| 2012/0016536 A1 | 1/2012 | Patel et al. | |
| 2012/0019670 A1* | 1/2012 | Chang | H04N 9/3147 348/189 |
| 2012/0075414 A1 | 3/2012 | Park et al. | |

FOREIGN PATENT DOCUMENTS

| | | |
|---|---|---|
| JP | 2007-214620 A | 8/2007 |
| WO | 2007045714 A1 | 4/2007 |

OTHER PUBLICATIONS

Dinh et al, High Resolution Face Sequence from a PTZ Network Camera, 2011.*

Park et al, Face Tracking and Recognition at a Distance: A Coaxial and Concentric PTZ Camera System, Oct. 2013.*

Dinh et al, High Resolution Face Sequences from a PTZ Network Camera, 2011.*

Niclass, et al., "Design and Characterization of a CMOS 3-D Image Sensor Based on Single Photon Avalanche Diodes," IEEE Journal of Solid-StateCircuits, vol. 40, No. 9, Sep. 2005; pp. 1847-1854.

Svoboda, et al., "Panoramic Cameras for 3D Computation," Czech Pattern Recognition Workshop 2000, Feb. 2-4, 2000; 8 Pages.

Wilburn et al., "High-Speed Videography Using a Dense Camera Array," IEEE Society Conference on Pattern Recognition, 2004; 8 Pages.

Invitation to Pay Additional Fees and, Where Applicable, Protest Fee Including Partial International Search in PCT Application No. PCT/US2009/000804, mailed on May 6, 2009; 4 Pages.

The State Intellectual Property Office of the People's Republic of China, "Notification of the First Office Action," Chinese Appln. No. 200980110758.8, Date of Issuing: Jun. 21, 2012; with English-language translation, 13 pages.

Japanese Patent Office, "Notice of Reasons for Rejection," Japanese Patent Appln. No. 2010-545890, dated: Sep. 28, 2012 (mailing date: Oct. 2, 2012): with English-language translation, 7 pages.

"Circle-Vision 360.degree.," Wikipedia, accessed at http://en.wikipedia.org/wiki/Circle-Vision.sub.—360%C2%B0, accessed on Feb. 5, 2008, 4 pages.

Examination Report, European Application No. 09708701.9, European Patent Office, Netherlands, mailed Jan. 10, 2012, 5 pages.

International Preliminary Report on Patentability and Written Opinion for International Application No. PCT/US2009/000804, International Bureau of WIPO, Switzerland, mailed Aug. 19, 2010.

(56) References Cited

OTHER PUBLICATIONS

International Search Report and Written Opinion for International Application No. PCT/US2009/000804, European Patent Office, Netherlands, mailed Jul. 13, 2009.
Australian Patent Examination Report directed to related Australian Application No. 2009210672, mailed Mar. 14, 2013; 4 pages.
Second Office Action directed to related Chinese Patent Application No. 200980110758.8, mailed Mar. 25, 2013; 4 pages.
JPO, Office Action, dated Jul. 2, 2013, Japanese Patent Application No. 2013-002323, 2 pages (English-language translation provided, 3 pages).
Japanese Office Action for Application No. 2013-002323 dated Mar. 12, 2014.
English Machine translation of JP 2006-217222.
Kaszubiak, et al., Real Time, 3-D-multi Object Position Estimation and Tracking, 2004.

* cited by examiner

PANORAMIC CAMERA WITH MULTIPLE IMAGE SENSORS USING TIMED SHUTTERS

CROSS-REFERENCE TO RELATED APPLICATIONS

This application is a continuation of U.S. patent application Ser. No. 13/780,493 filed Feb. 28, 2013, which is a divisional of U.S. patent application Ser. No. 12/368,014 filed Feb. 9, 2009, now U.S. Pat. No. 8,493,436 issued Jul. 23, 2013, which claims the benefit of U.S. Provisional Appl. No. 61/027,237, filed Feb. 8, 2008, the disclosures of which are incorporated herein by reference.

BACKGROUND

Field

The present invention relates to the field of panoramic still and motion photography.

Related Art

Imaging systems exist that include more than one camera in a rosette formation attached to a vehicle. Those imaging systems may be used to capture panoramic images, for example, along a street. Each camera includes an entrance pupil. Having multiple entrance pupils at different locations can cause spatial parallax. Parallax refers to a perceived shift of an imaged object against a background caused by the different viewpoints of the entrance pupils of the cameras. Parallax is a particular problem when stitching together images from multiple cameras, since it can cause ghosting of foreground objects when background objects are aligned in the region where adjacent images overlap.

Mirrors have been used to avoid parallax in panoramic imaging. For example, Disney's Circle-Vision 360° system uses mirrors to view the world through multiple co-located entrance pupils. This can result in zero parallax. However, making and using the necessary large mirrors is difficult. Also, this technique limits the vertical field of view.

Each camera in the rosette formation includes an image sensor that converts an optical signal into an electrical signal to form an image. Two types of image sensors avoid the need for a mechanical shutter—an interline-shutter charge-coupled device (CCD) or a complementary metal oxide semiconductor (CMOS) sensor.

The CMOS sensor typically has a rolling shutter, which exposes different lines of the scene at slightly different times, in a sequence that rolls across the image. The rolling shutter can lead to image distortion, such as warping, when the camera is moving relative to the scene or subject. Some work has been done to compensate for the image distortion. Wilburn et al. describes using a rolling shutter timing offset to process and correct distortions induced by motion of a subject of an image. See Wilburn et al., "High-Speed Videography Using a Dense Camera Array", 2004 *IEEE Computer Society Conference on Computer Vision and Pattern Recognition (CVPR'04)*, Vol. 2, pp. 294-301.

The interline-shutter CCD avoids the image distortion issues of the rolling shutter CMOS sensor. However, the interline-shutter CCD can suffer from blooming and streaking. Blooming and streaking occur when a portion of the sensor is over-exposed, causing light to spillover to adjacent pixels or into the readout CCD structure.

What is needed is an imaging apparatus that reduces distortion and spatial parallax, while avoiding the blooming and streaking issues associated with CCDs.

BRIEF SUMMARY

The present invention relates to the field of panoramic still and motion photography. In a first embodiment, a camera apparatus for panoramic photography includes a first image sensor positioned to capture a first image. The first image sensor has a rolling-shutter readout arranged in portrait orientation. The camera apparatus also includes second image sensor positioned to capture a second image. The second image sensor has a rolling-shutter readout arranged in portrait orientation. Finally, the camera apparatus includes a controller configured to signal the second image sensor to start capturing the second image before the first image sensor finishes capturing the first image. At least a portion of the first image is in front of the second image relative to a forward direction of the camera apparatus.

In a second embodiment, a method for panoramic photography includes the steps of: capturing a first image with a first image sensor and starting to capture a second image with a second image sensor prior to completion of the capturing of the first image. The first and second image sensors have a rolling-shutter readouts arranged in landscape orientation. At least a portion of the first image is in front of the second image relative to a forward direction of a camera apparatus comprising the first and second image sensors.

In a third embodiment, a camera apparatus for motion photography includes a first camera having a first entrance pupil. During forward motion of the camera apparatus, the first camera captures a first image. A camera apparatus also includes a second camera having a second entrance pupil. During the forward motion of the camera apparatus, the second camera captures a second image. Motion of the camera apparatus results in motion parallax. The timing of when the first camera captures a first image relative to when the second camera captures the second image uses the motion parallax to reduce the effect of spatial parallax between the first camera and the second camera.

In a fourth embodiment, a method for motion photography with a camera apparatus includes: capturing a first image with a first camera in the camera apparatus at a first time during forward motion of the camera apparatus, and capturing a second image with a second camera in the camera apparatus at a second time the during forward motion of the camera apparatus. Motion of the camera apparatus results in motion parallax. The timing of when the capturing (a) occurs relative to when the capturing (b) occurs uses the motion parallax to reduce the effect of spatial parallax between the first camera and the second camera.

In this way, embodiments of the present invention reduce distortion and spatial parallax.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of present invention reduce distortion and spatial parallax in panoramic images taken from a camera rosette affixed to a vehicle. Each camera in the camera rosette includes an image sensor. The image sensor may expose to capture an image while the vehicle is moving. This movement can cause distortion in the resulting image. In an embodiment of the present invention, the CMOS sensor is arranged in "portrait" orientation. As is described in detail below, this reduces the image distortion.

Having multiple cameras in different locations on the camera rosette can cause spatial parallax. In a further embodiment of the present invention, the motion parallax of the vehicle is employed to cancel out spatial parallax. In that embodiment, as the vehicle moves, exposure of the cameras in the camera rosette is timed such that the entrance pupils of the cameras are in approximately the same location when each sensor is exposed. This embodiment is described in detail below.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "camera rosette" used herein refers to two or more cameras arranged to capture a panoramic image. Each camera captures an image. The images may be stitched together to form the panoramic image. This stitching may, for example, be done by well-known software techniques.

The term "camera" used herein refers to a device that captures a photographic image. A camera includes an image sensor, and a lens having an entrance pupil.

The term "image sensor" used herein refers to a device that converts optical signals into electrical signals to capture an image when exposed.

Figure 1A:
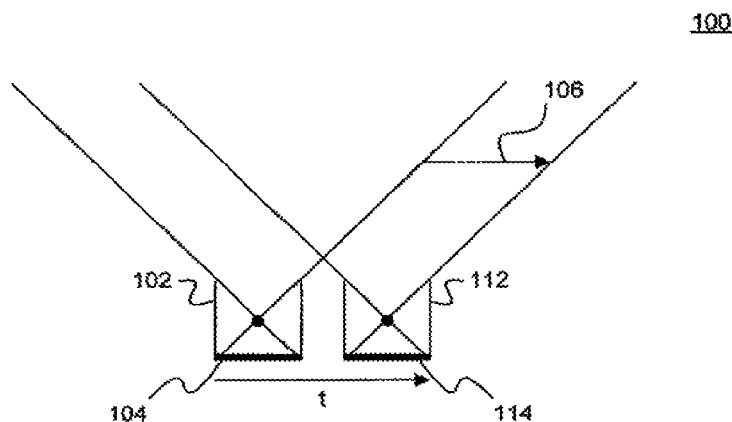
FIG. 1A includes a diagram illustrating a camera that includes a rolling-shutter CMOS sensor.

FIG. 1A includes a diagram 100 illustrating a camera that includes a rolling-shutter CMOS image sensor. Diagram 100 shows a camera and its image sensor at two points in time. At a first point in time, the camera is at a position 102 and its image sensor is at a position 104. At a second point in time, the camera is at a position 112 and its image sensor is at a position 114. The dot in the figure represents the entrance pupil of the lens, and rays are shown projecting through it in the manner of a pinhole camera for simplicity.

In an example, the camera may be attached to a vehicle, and movement of the vehicle may have caused the camera to move. As mentioned above, the image sensor may be a rolling shutter CMOS sensor. A rolling shutter CMOS sensor may include groups of photodiodes that capture light and convert the light into electrical signals during exposure. A rolling shutter CMOS sensor may expose different groups of photodiodes at different times. A rolling shutter CMOS sensor has a readout time. The readout time is the time necessary to read out all the groups of photodiodes at the ends of their respective exposure times. In the example shown in FIG. 1A, the CMOS sensor is in "landscape" orientation, meaning that the groups of photodiodes are arranged as rows running parallel to the ground.

The rolling shutter sensor may be exposed while the vehicle is in motion. In an example, a rolling shutter sensor may require 100 ms of readout time to capture an image. While the image is captured, the vehicle and camera may have moved forward 1 m. The movement causes the objects captured by the image sensor to change as shown at 106. This causes distortion in the resulting image. Because different rows of photodiodes in the CMOS sensors are exposed at different times, the image may appear warped, e.g. vertical features may be slanted. An image sensor that does not have a rolling shutter and is exposed in its entirety, such as an interline-shutter CCD sensor, may reduce or avoid warping. However, as mentioned earlier, interline-shutter CCD sensors may suffer from blooming and streaking.

Figure 1B:
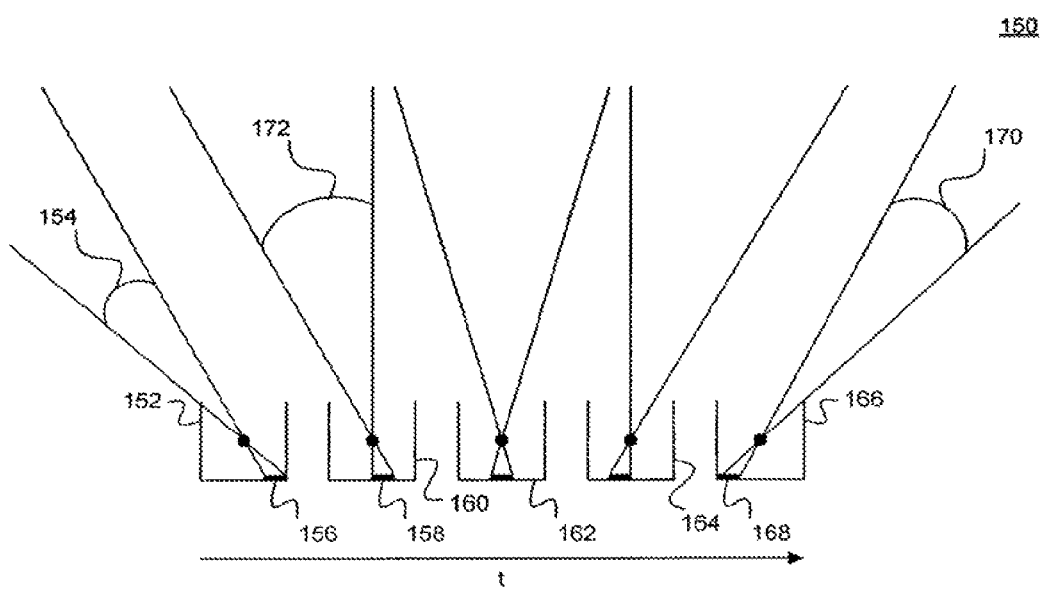
FIG. 1B includes a diagram illustrating a camera having a rolling-shutter CMOS sensor with groups of photodiodes arranged in columns substantially perpendicular to the ground, according to an embodiment of the present invention.

To deal with the problem of warping due to rolling shutter sensors, embodiments of the present invention have rolling shutter image sensors arranged in "portrait" orientation as illustrated in FIG. 1B. FIG. 1B includes a diagram 150 illustrating a camera having a rolling-shutter sensor, such as a CMOS sensor, in portrait orientation. Portrait orientation means that the groups of photodiodes are arranged in columns running perpendicular to the ground.

Diagram 150 shows a camera at different positions at different points in time. As mentioned earlier, the camera may be affixed to a vehicle, and the vehicle may be in motion. In an embodiment of the invention, the columns of photodiodes are exposed back-to-front in object space and front-to-back in image space.

At a position 152, the camera exposes a forward-most photodiode column 156 to capture an image including a back-most field of view 154. Then, at a position 160, the camera exposes a photodiode column 158, which is behind photodiode column 156. This exposure captures a field of view 172, which is to the front of field of view 154. As the camera moves to a position 162 and a position 164, columns continue to expose in a front-to-back manner, which captures objects from back-to-front. Finally, when the camera is at a position 166, the camera exposes a back-most photodiode column 168 to capture an image including a forward-most field of view 170.

Positioning the image sensor in portrait orientation avoids the warping of vertical features that occurs in landscape orientation. Instead, objects may appear stretched by an amount that depends on their distance. Stretching is not as visually unappealing as warping. In fact, stretching may be a positive feature. Stretching makes foreground objects thinner with respect to background objects, rather than fatter, when the rolling shutter is arranged in the direction described. As result, the foreground objects occlude less of the scene behind them. This may be a benefit in many applications related to panoramic imaging.

Panoramic imaging often includes taking images from multiple cameras oriented in different directions. The multiple images may then be stitched together into a panorama using well-known software techniques. When multiple cameras are used in this way, an object may exist in the field of view of more than one camera. In motion photography, objects may move or change over time relative to the cameras. If multiple cameras expose the object at different times, then the object may appear differently in the multiple images to stitch together into a single panorama. The resulting panorama may have ghosting or other undesirable image problems. To deal with this, exposure needs to be coordinated between the multiple cameras to capture objects at the same time or close to the same time. This becomes even more challenging with rolling shutter image sensors because different portions of each image sensor are exposed as different times. To deal with this, embodiments of the present invention time exposure of multiple image sensors as illustrated in FIGS. 2A-C.

Figure 2A:
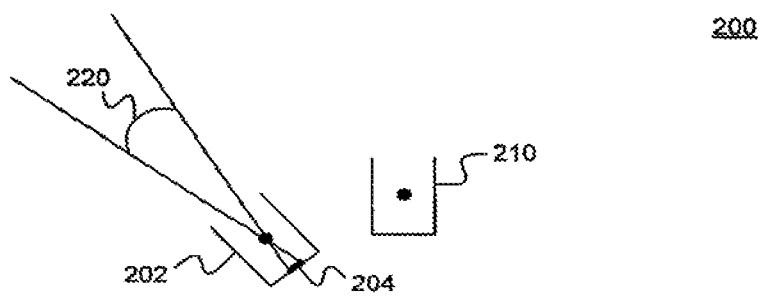
FIGS. 2A-C include diagrams illustrating a portion of a camera rosette which may be used in panoramic imaging, according to an embodiment of the present invention.
Figure 2B:
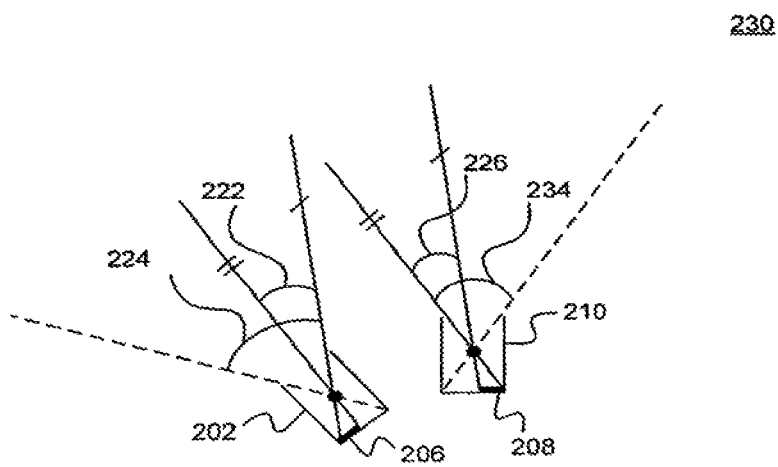
Figure 2C:
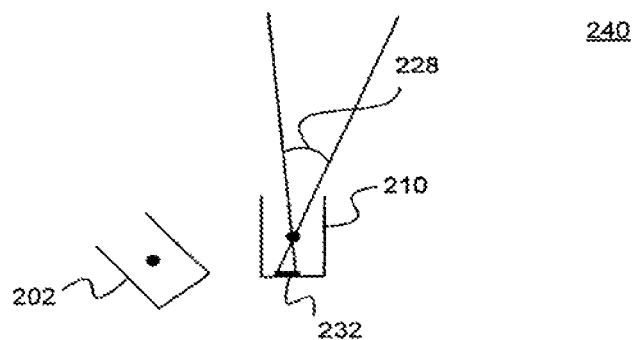

FIGS. 2A-C include diagrams illustrating a portion of a camera rosette, which may be used in panoramic imaging. Each camera in the camera rosette includes a rolling-shutter image sensor, such as a rolling-shutter CMOS sensor, in portrait orientation as described with respect to FIG. 1B.

FIG. 2A includes a diagram 200. Diagram 200 shows a camera rosette with cameras 202 and 210. For clarity, only two cameras are shown. However, in practice the rosette may contain a different number of cameras. Camera 202 has photodiode column 204 exposed to a field of view 220.

FIG. 2B includes a diagram 230. Diagram 230 shows the rosette shown in FIG. 2A at a later point in time. Camera 202 has a total field of view 224, and camera 210 has a total field of view 234. As camera 202 scans across field of view 224 back-to-front (in object space), camera 202 begins to expose photodiode columns from a group of photodiode columns 206. Group of columns 206 captures objects within field of view 222. Field of view 222 overlaps with camera 210's total field of view 234 for distant objects.

When camera 202 begins to expose photodiode columns from group of columns 206, camera 210 begins to expose photodiode columns from a group of photodiode columns 208. Camera 210 exposes photodiode columns in group of columns 208 back-to-front (in object space) to capture field of view 226. Field of view 226 overlaps with camera 202's total field of view 224 for distant objects. Effectively, camera 202 exposes photodiode columns in group of columns 206 simultaneously with camera 210 exposing photodiode columns in group of columns 208. When camera 202 completes exposure of group of columns 206, camera 202 finishes its exposure. However, camera 210 continues to expose photodiode columns, as shown FIG. 2C.

FIG. 2C shows a diagram 240. Diagram 240 shows the rosette shown in FIG. 2B at a later point in time after camera 202 has completed its exposure. In diagram 240, a photodiode column 232 is exposed, capturing a field of view 228. As camera 210 continues its exposure, it may overlap with an field of view with another camera (not shown) and the process may continue for an entire camera rosette as is described with respect to FIG. 3.

The embodiment illustrated in FIGS. 2A-C is described with respect to an illustrative example. In an example, overlap field of view 222 for distant objects between camera 202 and camera 210 may be 10% of total field of view 224 of camera 202. In that example, the delay between the time when camera 202 starts exposure and the time when camera 210 starts exposure may be 90% of camera 202 readout time. Camera 202 and 210 may or may not have the same readout time. In an example where the readout time is 100 ms, the delay between the time when camera 202 starts exposure and the time when camera 210 starts exposure may be 90 ms.

The camera rosette may have at least one controller that synchronizes the cameras to capture images at specified time offsets. So, the controller may be preprogrammed with the delays indicating when each camera starts to capture an image.

In another embodiment, the delay time may be offset according to the vehicle's velocity. As is described below with respect to FIG. 5, this has the effect of using motion parallax from movement of the vehicle to cancel out spatial parallax caused by the multiple cameras.

As mentioned above, the operation of the two cameras described with respect to FIGS. 2A-C may continue through an entire camera rosette. In one embodiment, a camera rosette may have a total of between six and ten cameras, inclusive, positioned to capture a 360 degree panorama. In a preferred embodiment, the camera rosette may have at least eight cameras, such as the rosette illustrated with respect to FIG. 3.

Figure 3:
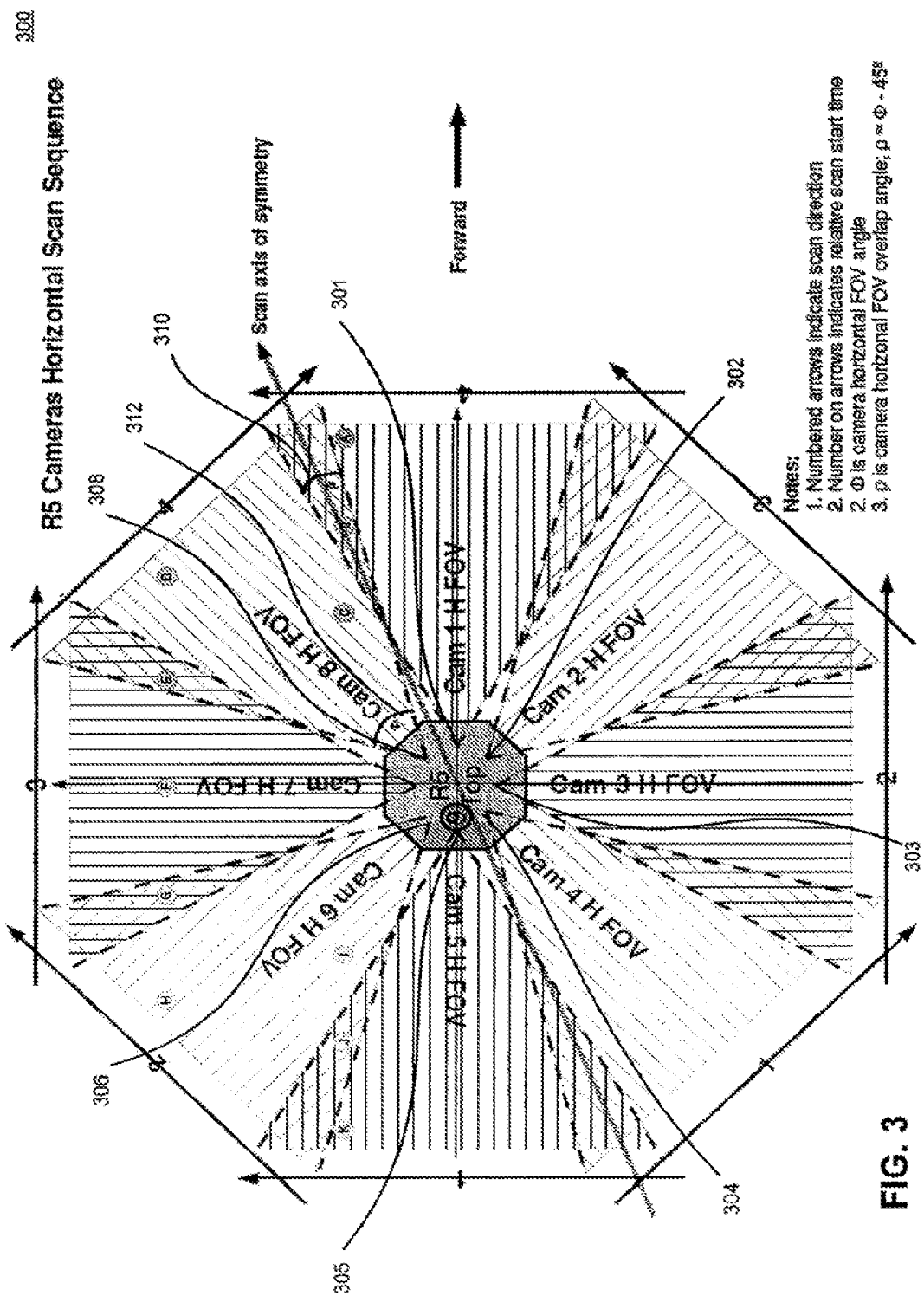
FIG. 3 includes a diagram showing the operation of the camera rosette shown in FIGS. 2A-C in further detail.

FIG. 3 shows a diagram 300 illustrating the operation of a camera rosette according to an embodiment of the present invention in further detail. In a preferred embodiment, a camera rosette may include nine cameras—eight in a horizontal ring, and one directed straight up. Diagram 300 shows the eight horizontal cameras. Each camera in the camera rosette includes a rolling shutter sensor in portrait orientation with columns of photodiodes.

The camera rosette begins capturing a panoramic image at the rear-most cameras 305 and 304. Both of the cameras 305 and 304 start by exposing the back most photodiodes columns (in object-space) and scan forward as described with respect to FIG. 1B. Cameras 306, 303 start capturing images at a time defined by a time delay as described with respect to FIG. 2B.

The rosette continues to scan forward until the forward-most cameras 301, 308 have completed scanning Each camera starts at a time defined by the start of the adjacent camera to its rear plus a delay. For example, a camera 302 starts at a time defined by the start of camera 303 plus a delay. The delay may correspond to the size of the overlap in the field of view of adjacent cameras, as described with respect to FIG. 2B. The delay may also be offset according to the velocity of the vehicle, as is described with respect to FIG. 5.

Each of the eight cameras in FIG. 3 is at a different location and has an entrance pupil at a different location. Having entrance pupils at different locations causes spatial parallax as illustrated in FIGS. 4A-B.

Figure 4A:
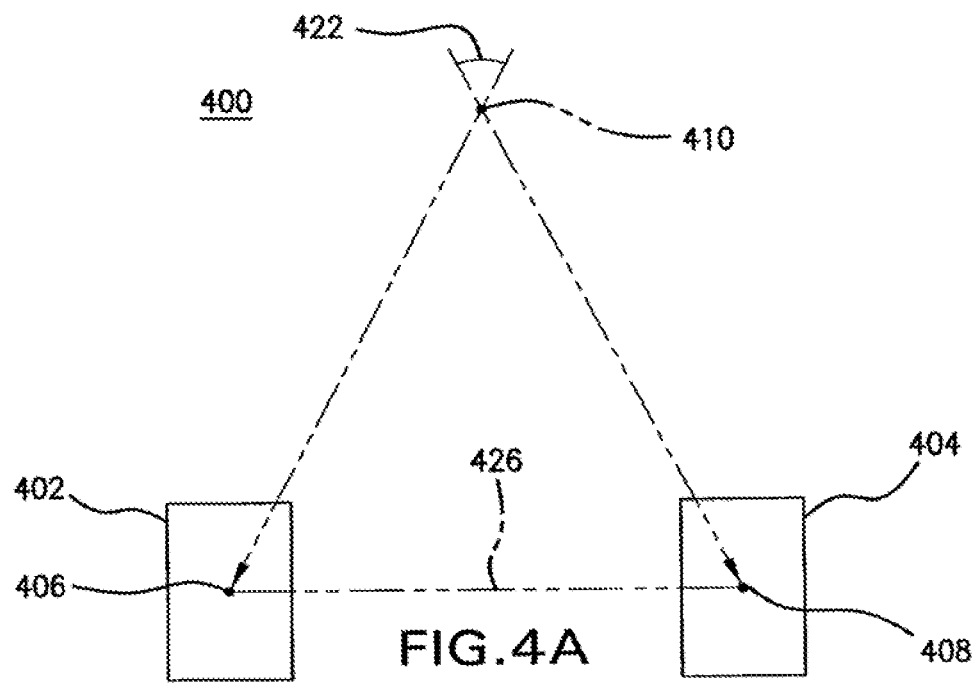
FIGS. 4A-B show how positioning of the entrance pupils of a camera impacts parallax.
Figure 4B:
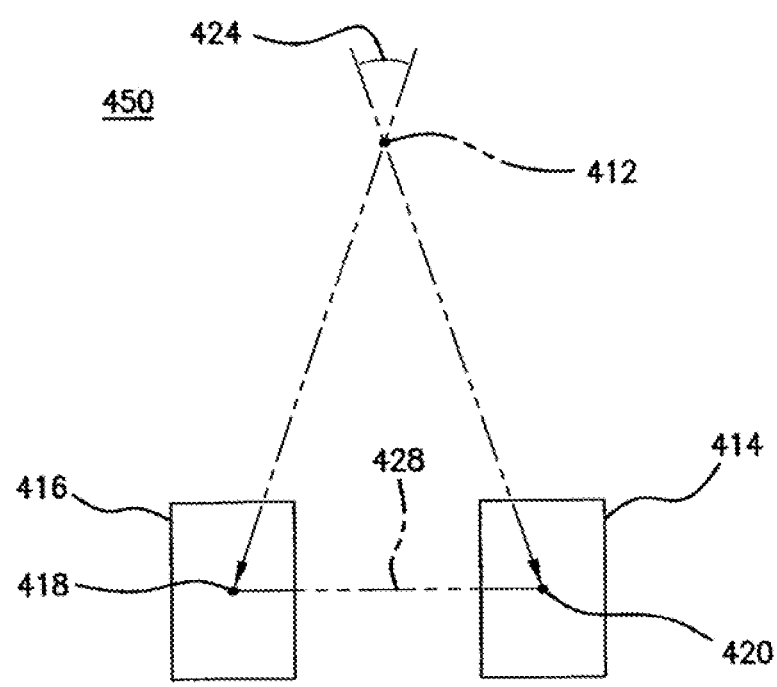

FIGS. 4A-B show how the positioning of the entrance pupils of two cameras impacts spatial parallax. FIG. 4A shows an example imaging apparatus 400. Imaging apparatus 400 includes a camera 402 and a camera 404. Camera 402 has an entrance pupil 406, and camera 404 has an entrance pupil 408. Entrance pupil 406 and entrance pupil 408 are separated by a distance 426. Each camera 402, 404 captures an image including an object 410. However there is a wide difference in the background of object 410 as it appears in cameras 402, 404. This is shown by the large parallax angle 422.

FIG. 4B shows an example imaging apparatus 450. Imaging apparatus 450 includes a camera 416 and a camera 414. Camera 416 has an entrance pupil 418, and camera 414 has an entrance pupil 420. Entrance pupil 418 and entrance pupil 420 are separated by a distance 428. Distance 428 is shorter than distance 426 in FIG. 4A. Each camera 416, 414 captures an image including an object 412. There is a small difference in the background of object 412 as it appears in cameras 416, 414, as compared to cameras 402, 404 in FIG. 4A. This is shown by the parallax angle 424. Therefore, parallax angle 422 in FIG. 4B is less than parallax angle 424 in FIG. 4A.

Thus, two cameras being in different places can cause spatial parallax. Similarly, motion parallax is caused by a camera being in different locations at different times. According to an embodiment of the present invention, motion parallax caused by motion of a camera rosette by cancel out or reduce the effect of spatial parallax caused by the entrance pupils of the different cameras on the camera rosette being located at different locations. This embodiment is illustrated in FIG. 5.

Figure 5:
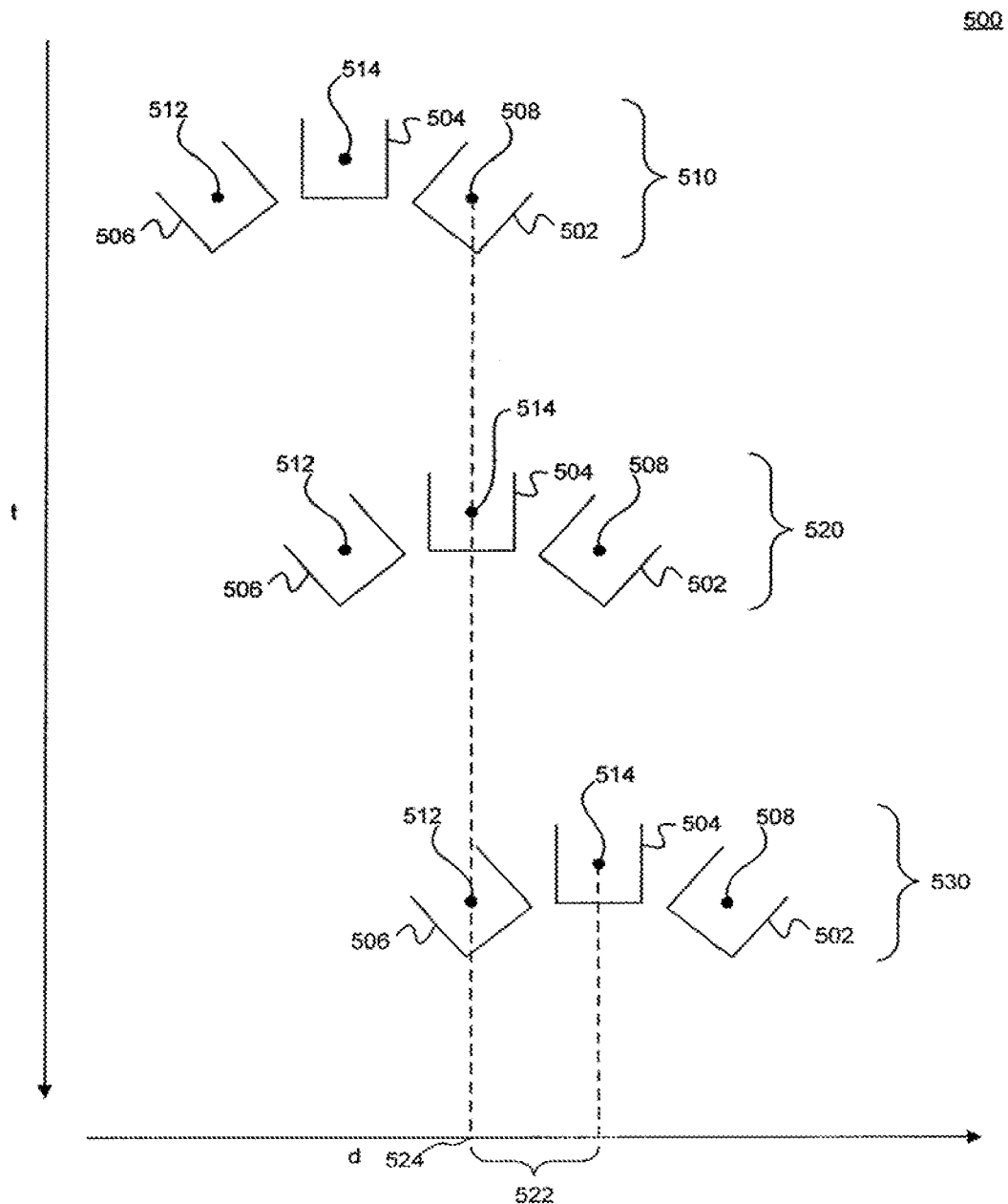
FIG. 5 shows a diagram illustrating timing the exposure of cameras in a camera rosette to reduce spatial parallax, according to an embodiment of the present invention.

FIG. 5 shows a diagram 500 illustrating timing the exposure of cameras in a camera rosette to reduce parallax, according to an embodiment of the present invention. As shown in FIG. 4A-B, as camera entrance pupils get closer together, the spatial parallax between the cameras decreases. Diagram 500 shows how to time the exposure of the cameras during motion of the vehicle so that each of the cameras is exposed when its entrance pupil is located at approximately the same location. As result, in diagram 500 the motion parallax caused by the moving vehicle reduces the spatial parallax due to multiple cameras.

Diagram 500 shows a portion of a camera rosette at three positions 510, 520, 530 at three different points in time. The camera rosette shown has three cameras 502, 504, and 506 shown. Cameras 502, 504, and 506 have entrance pupils 508, 514, and 512 respectively. For clarity, only three cameras are shown. However, in practice a different number of cameras may be used (e.g. 8 horizontal cameras and 9 total cameras in another embodiment).

In the embodiment in FIG. 5, the image sensors may or may not have rolling shutters. The embodiment may be useful with rolling shutters. However, the embodiment may also reduce parallax with image sensors having "global" shutter, such as an interline CCD or an image sensor using a mechanical shutter. The image capture is described as happening at an instant, even though there will be some exposure duration and a small motion blur as a result. At position 510, camera 502 captures an image. At position 510, camera 502's entrance pupil 508 is at a location 524. Each subsequent camera is timed to take an image when that camera's entrance pupil is approximately located at location 524.

During a later point in time as the vehicle is moving, the camera rosette reaches position 520. At position 520, entrance pupil 514 of camera 504 is approximately at location 524. At this point, camera 504 captures an image. Finally, at position 530 entrance pupil 512 of camera 506 reaches approximately location 524, and camera 506 captures an image.

The approximation may be due to inaccuracies in the vehicles velocity, or changes to the vehicle's direction. In an example, the approximation may be based on an average vehicle velocity as opposed to the actual velocity over the relevant period. Also, the approximation may be due to the fact that cameras are positioned two or three dimensionally on the camera rosette, whereas the movement of the rosette (e.g., on a vehicle) may be in only one direction. For example, in FIG. 5 entrance pupil 508 is not at precisely the same location as entrance pupil 514 because entrance pupil 508 are entrance pupil 514 are at different locations on the axis perpendicular to the axis of motion.

In another embodiment, a virtual plane is perpendicular to the direction of motion of a camera rosette. Each camera in a camera rosette may expose when an entrance pupil of the camera passes through the plane. In this way, each camera exposes when its entrance pupil is at approximately the same location, reducing parallax.

As noted earlier, the time to trigger each subsequent camera may be calculated according to vehicle velocity and a distance between the cameras, such as a distance 522. In the example shown, the delay from a time when camera 504 captures an image and a time when camera 506 captures an image is distance 522 divided by the vehicle's velocity. Supposing distance 522 was 10 cm and the vehicle velocity was 10 m/s, then the delay between the time when camera 504 captures an image and the time when camera 506 captures an image would be 10 ms. In other words, the further rear camera (camera 506) starts to capture an image 10 ms after the more forward camera (camera 504).

As mentioned earlier, a vehicle velocity used to time the cameras may be an average vehicle velocity. Alternatively, the vehicle velocity may be determined in real time by a speedometer, a wheel encoder, or a GPS sensor. The velocity may be signaled to controllers in the cameras, which adjust the timing accordingly.

In a preferred embodiment, the features shown in diagram 500 may be used in conjunction with the features described with respect to FIGS. 2A-C. FIG. 2B describes timing camera exposure in a camera rosette where each camera includes a rolling-shutter CMOS sensor in portrait orientation. In that embodiment, each camera is timed to start exposure when the previous camera begins to scan an region where their fields of view overlap at a distance. Describing the embodiment with respect to FIG. 2B, a delay between when camera 202 starts exposure and when camera 210 starts exposure substantially satisfies the equation:

$$t = R_1 \cdot F_1 - \frac{D_{12}}{v},$$

where t is the delay time, $R_1$ is a rolling-shutter readout time of the first image sensor, $F_1$ is a percentage of the field of view of the first image sensor which does not overlap with the field of view of the second image sensor, $D_{12}$ is a distance between an entrance pupil of the first image sensor and an entrance pupil of the second image sensor, and v is a speed of the camera apparatus. It would be recognized that small changes such as small offsets and coefficients may be added to this equation.

In an example given with respect to FIG. 2B, overlap field of view 222 between camera 202 and camera 210 may be 10% of the total field of view of camera 202. In that example, 90% of camera 202's field of view does not overlap with camera 210's field of view. In an example where camera 202's readout time is 100 ms, the delay between the time when camera 202 starts exposure and the time when camera 210 starts exposure may be 90 ms. In other words, the more forward camera (camera 210) starts to capture an image 90 ms after the further rear camera starts to capture an image (camera 202). As a result, cameras with overlapping fields of view capture images of objects in their overlap region at the same time, or from the same vehicle position. This timing is a first-order correction for parallax, in that it prevents the large parallax errors that would result if the objects in the overlap area were captured at very different times and very different vehicle positions, as would happen if the cameras started their rolling shutters simultaneously. However, there remains a smaller parallax error due to the entrance pupils of the cameras not being in the same place.

In an example of the embodiment incorporating both features in diagram 500 and FIGS. 2A-C, the delay time is offset to further reduce spatial parallax. In the example given with respect to FIG. 5, the further rear camera (camera 506) starts to capture an image 10 ms after the more forward camera (camera 504). In the example in FIGS. 2A-C, the more forward camera (camera 210) starts to capture an image 90 ms after the further rear camera starts to capture an image (camera 202). In the combined embodiment, the 90 ms delay is offset by 10 ms. Therefore, the more forward camera starts to capture an image 80 ms after the further rear camera starts to capture an image. This embodiment has reduced spatial parallax, accounting jointly for rolling-shutter readout delay, vehicle velocity, and entrance pupil separation.

In another embodiment, the timing offsets for reduced spatial parallax may only be applied to some of the cameras in a camera rosette. In an example, the offset may be applied to only those cameras pointed sideways from the vehicle motion. The cameras pointed sideways may be the cameras where typical vehicle motion moves the location of the entrance pupil of the more rear camera into the location where the camera took an image in, for example, 0.01 s or less. In this example, spatial parallax of forward-looking and backward-looking portions of the panorama may not be cancelled by motion parallax, but objects in these directions tend to be distant enough to not have a large parallax problem.

As an alternative embodiment, a rolling shutter with a very fast readout time may be useful. As the shutter readout time becomes faster, the delay computed to account for the rolling shutter (as described in FIGS. 2A-C) decreases. So, at a particular readout time, the delay for the rolling shutter and the offset to account for spatial parallax may cancel each other out. This readout time is the time it takes for the vehicle to move forward a distance equal to the distance between entrance pupils. In an example, a readout time of a first image sensor may be 10 ms. Ninety percent of the first image sensor's field of view may not overlap with a second, next forward-most image sensor. If the vehicle is stationary, the delay time between exposure of the first and second image sensor would be 9 ms. However, if the vehicle is moving at 9 m/s and the distance between the first and second image sensor is 10 cm, then the delay offset due to motion of the vehicle would also be 9 ms. Thus, the offsets would effectively cancel each other out. Similarly, an image sensor with a variable rolling readout time may be used. In that instance, the readout time may be adjusted according to a speed of the vehicle.

Figure 6:
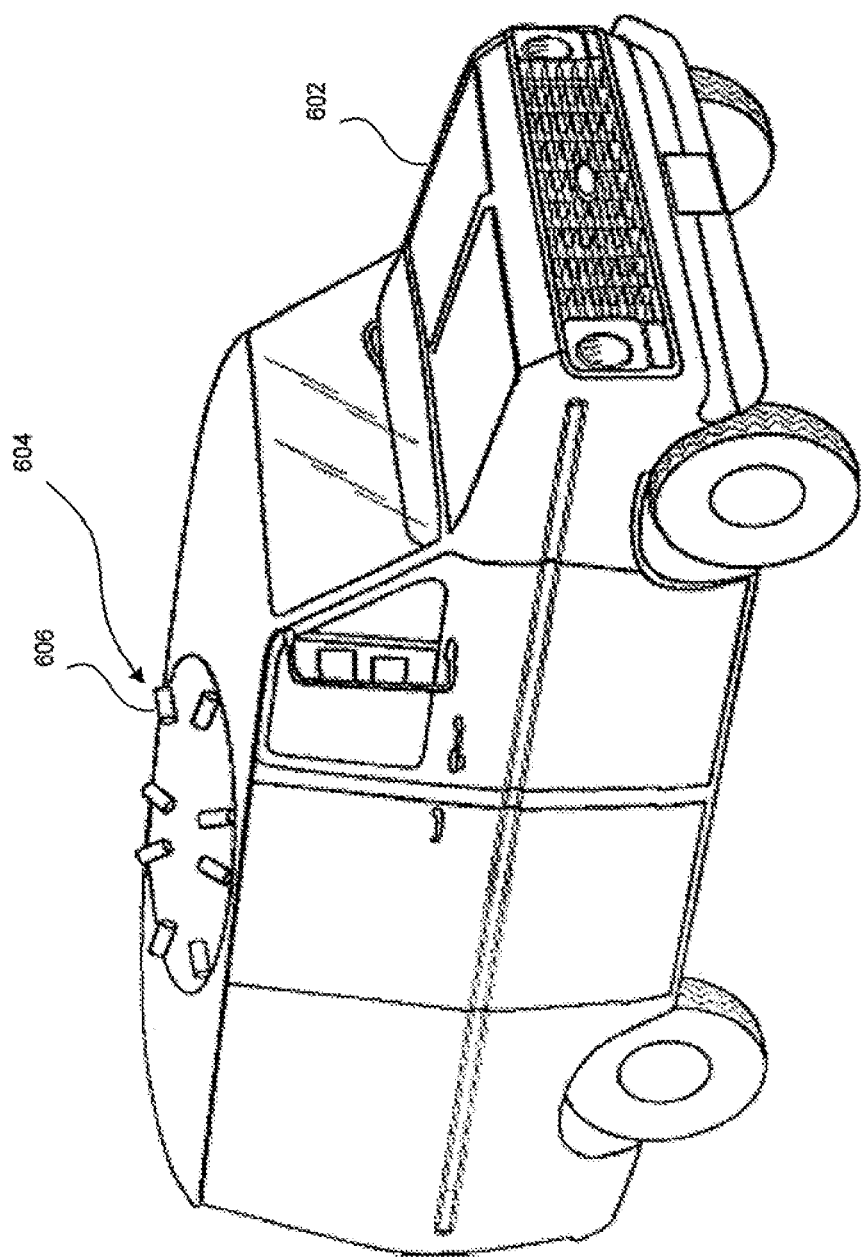
FIG. 6 shows a diagram of a camera rosette affixed to a vehicle.

FIG. 6 shows a camera rosette 604 affixed to a vehicle 602. Camera rosette 604 includes numerous cameras, such as a camera 606. In an example, camera rosette 604 may be used to capture panoramic images of buildings running along a street.

Each of the cameras in the camera rosette is coupled to a controller 608. As mentioned earlier, controller 608 controls the timing of the exposure of each camera. Controller 608 may receive an input indicating a speed of the vehicle. Alternatively, controller 608 may be preprogrammed with timing offsets, such as offsets based on an average speed of the vehicle. A single controller 608 may be used. Alternatively, each camera may have its own controller.

Controller 608 may be implemented in hardware, software, firmware, or any combination thereof. Controller 608 may be, for example, a general purpose computer running software to control the cameras' exposure. Controller 608 may have a processor and memory.

The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of capturing images to reduce parallax between a first image and a second image caused by movement of a camera apparatus, the method comprising:
   moving the camera apparatus, the camera apparatus including a first camera and a second camera;
   while moving the camera apparatus, starting to expose the first image using the first camera at a time T1 using the first camera;
   while moving the camera apparatus, starting to expose the second image using the second camera at a time T2, wherein T2 is after T1;
   while moving the camera apparatus, completing exposure of the first image at a time T3 after the time T2 such that the first image and the second image include overlapping fields of view captured by the camera apparatus between the times T2 and T3 in order to reduce parallax between the first image and the second image.

2. The method of claim 1, wherein the first camera includes a first image sensor and the second camera includes a second image sensor and different portions of the first and second image sensors are exposed at different times in order to capture the first and second images.

3. The method of claim 1, wherein the first camera includes a set of photodiode columns, and starting to capture the first image includes starting to expose a first column of the set of photodiode columns of the first camera prior to starting the capture the second image, and completing exposure of the first image includes completing exposure of all columns of the set of photodiode columns of the first camera.

4. The method of claim 3, wherein the second camera apparatus includes a set of photodiode columns, and starting to capture the second image includes starting to expose a first column of the set of photodiode columns of the second camera after exposing the first column of the set of photodiode columns but prior to completing exposure of all columns of the set of photodiode columns of the first camera.

5. The method of claim 3, wherein moving the camera apparatus includes moving the camera apparatus in a first direction, and wherein the first column of the set of photodiode columns of the first camera is a forward most column of the set of photodiode columns of the first camera relative to the first direction.

6. The method of claim 5, wherein completing exposure of the first image includes completing exposure of a back most column of the set of photodiode columns of the first camera relative to the first direction.

7. The method of claim 3, wherein the set of photodiode columns are arranged in a portrait orientation relative to a ground surface.

8. The method of claim 1, further comprising completing exposure of the first image in order to reduce a likelihood that an object in the overlapping field of view has moved between the times T2 and T3.

9. The method of claim 1, further comprising completing exposure of the second image at a time T4 after the time T3.

10. The method of claim 1, wherein moving the camera apparatus includes moving the camera apparatus at a given speed, and the method further comprises, prior to starting to expose the second image, determining the time T2 based on the given speed.

11. The method of claim 10, wherein the given speed is an average speed of the movement of the camera apparatus while the first and second images are being exposed.

12. The method of claim 11, wherein determining the time T2 is further based on a distance between entrance pupils of the first and second cameras.

13. The method of claim 1, wherein the camera apparatus includes a set of cameras including the first and second cameras, and the method further comprising, while moving the camera apparatus, capturing additional images using the set of cameras where each additional image has an overlapping field of view with at least one other of the additional images.

14. The method of claim 1, wherein a difference in time between T2 and T3 is proportionate to a size of the overlapping fields of view.

* * * * *